Figure 1:
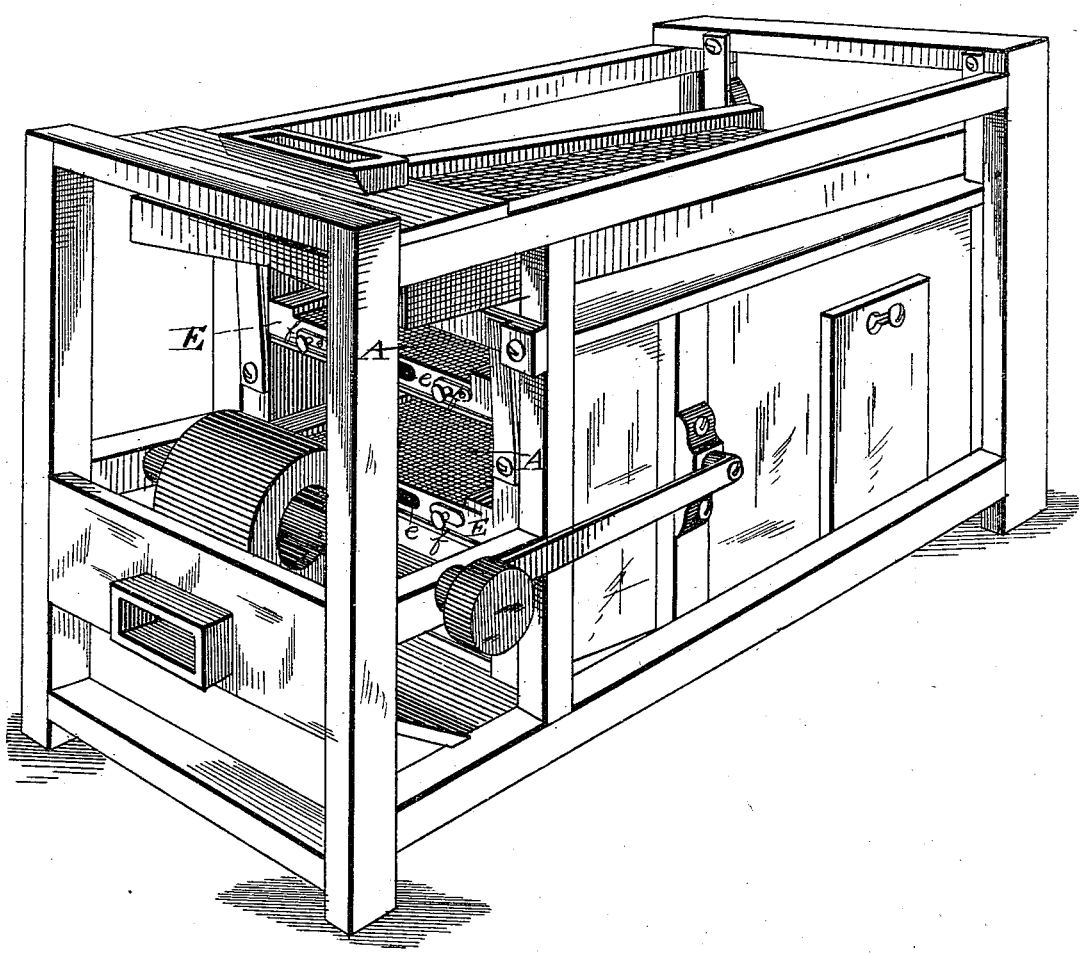

3 Sheets—Sheet 1.

W. H. RHODES.
Grain and Middlings Separators.

No. 213,070. Patented Mar. 11, 1879.

WITNESSES

INVENTOR

3 Sheets—Sheet 3.

W. H. RHODES.
Grain and Middlings Separators.

No. 213,070. Patented Mar. 11, 1879.

WITNESSES
E. J. Nottingham
A. W. Bright

INVENTOR
Wm H Rhodes.
By Leggett & Leggett.
ATTORNEYS

UNITED STATES PATENT OFFICE.

WILLIAM H. RHODES, OF FREEPORT, ILLINOIS.

IMPROVEMENT IN GRAIN AND MIDDLINGS SEPARATORS.

Specification forming part of Letters Patent No. 213,070, dated March 11, 1879; application filed September 6, 1878.

*To all whom it may concern:*

Be it known that I, WILLIAM HAWKINS RHODES, of Freeport, in the county of Stephenson and State of Illinois, have invented certain new and useful Improvements in Grain-Purifiers; and I do hereby declare the following to be a full, clear, and exact description of the invention, such as will enable others skilled in the art to which it pertains to make and use it, reference being had to the accompanying drawings, which form part of this specification.

My invention relates especially to gang-screen machines designed as middlings-purifiers, but is also equally applicable to purifiers of grain, seeds, or any granulated substances.

Heretofore gang-screen machines have been subject to the disadvantage that there has been no construction by which the clean grain, as it falls through the forward or forward and central portions of the respective screens, could be separated from the remainder and independently discharged from the machine. The objectionable result is that, while in the operation of the machine a large portion of the middlings or other granulated substance or grain is well cleaned by the current of air which passes through them as they fall from the several screens to the respective returning-boards next below the same, the light stuff and other impurities pass rearward, where they are mixed on said returning-boards with the clean matter, and are either taken off in this condition by a side discharge or are carried forward to the screens below to undergo a repetition of said process of alternate separations and mixings.

My invention is designed to obviate this disadvantage in construction, and hence remove said objectionable result, together with others, while at the same time the working capacity of the machine will be considerably increased.

The invention consists, first, of a gang of screens and returning-boards arranged in pairs, in combination with a series of adjustable cut-offs, located, respectively, between each screen and its conveyer-board, the same being adapted, as described, to separate that portion of the grain which passes through the forward or forward and central body, respectively, of each screen, and directly discharge it, while the remaining portion of the grain passes onto the next succeeding screen, there to be subjected to a repetition of said separating process; secondly, of a gang of screens and returning-boards, arranged in pairs, one above the other, in combination with a series of adjustable cut-offs, located between each screen and its conveyer-board, and separate discharge-spouts for each of the said cut-offs, the same being adapted, as described, to separate and independently discharge from the machine that portion of the grain which falls through the forward or forward and central body, respectively, of the several screens; thirdly, in the combination, with a series of cut-offs, located, respectively, between each of the several screens and its returning-board, said cut-offs being provided with discharges, of rear-end inclosures provided with valve-openings, valves, and mechanism for securing the latter at any desired adjustment, the same being adapted to separate that portion of the grain which falls through the forward or forward and central portion, respectively, at the several screens, and subject said grain to an adjustable current of air during its passage from the screens, whereby the said separation may be regulated as desired.

The invention further consists in the mechanism employed by me in carrying out the above-named main features of my improvement.

Figure 2:
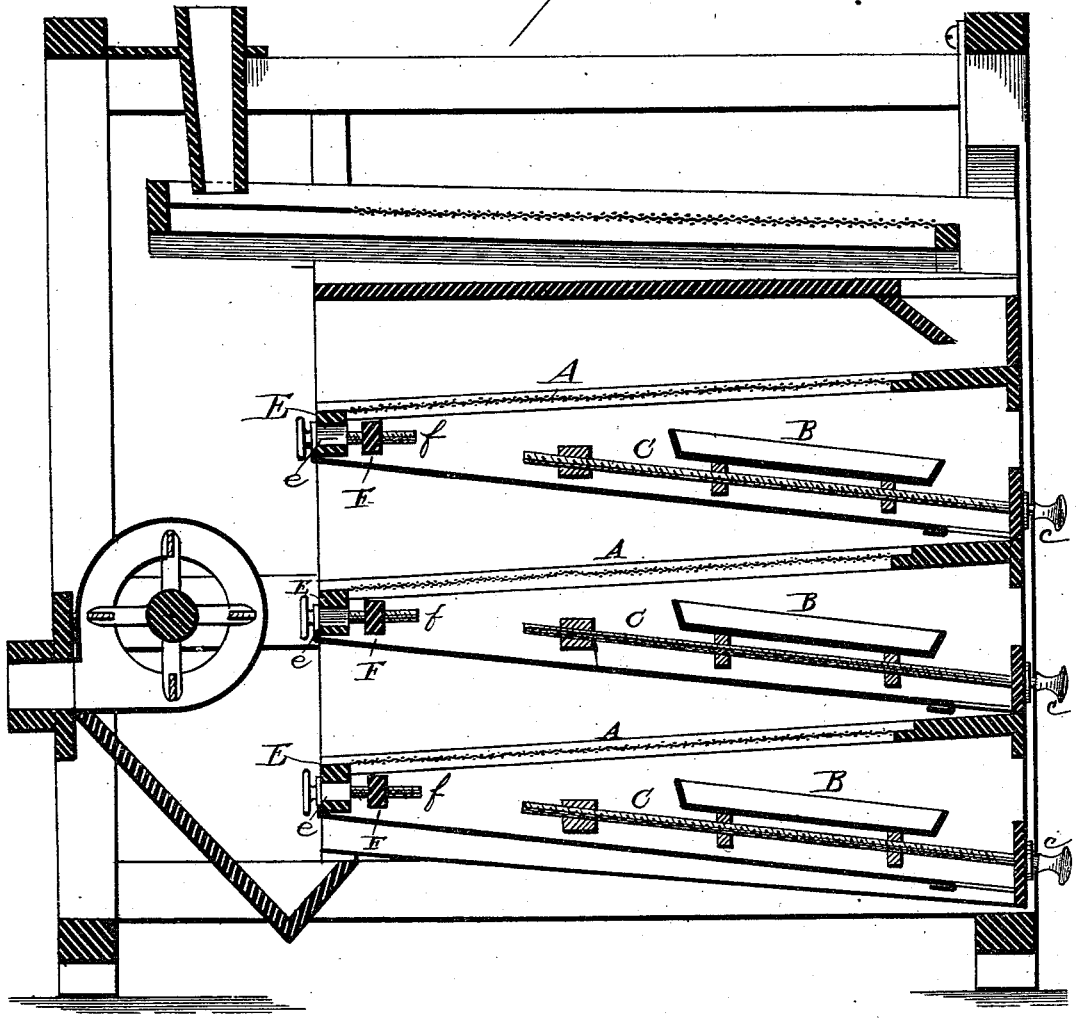
Figure 3:
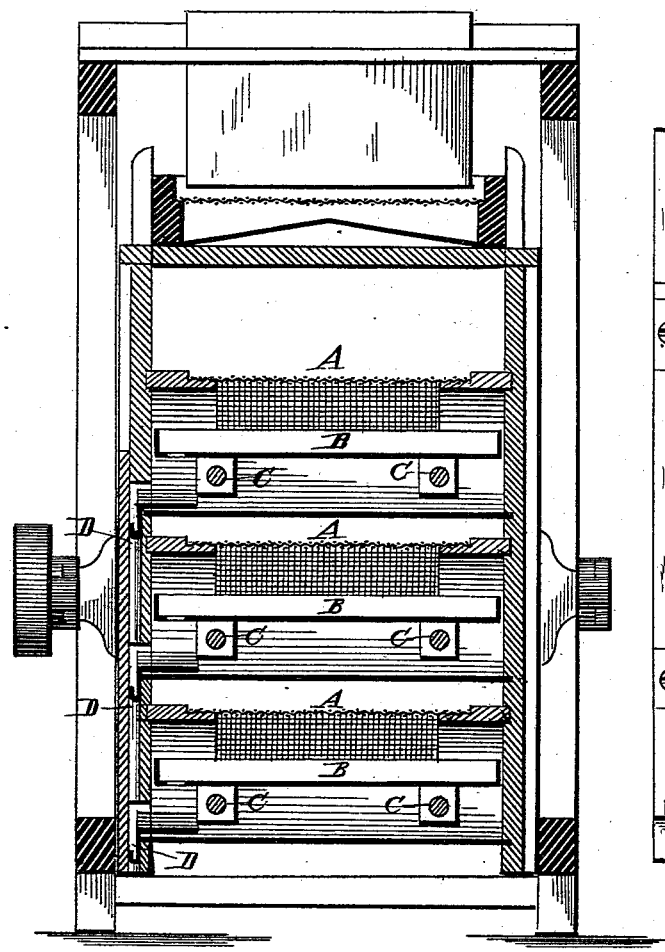
Figure 4:
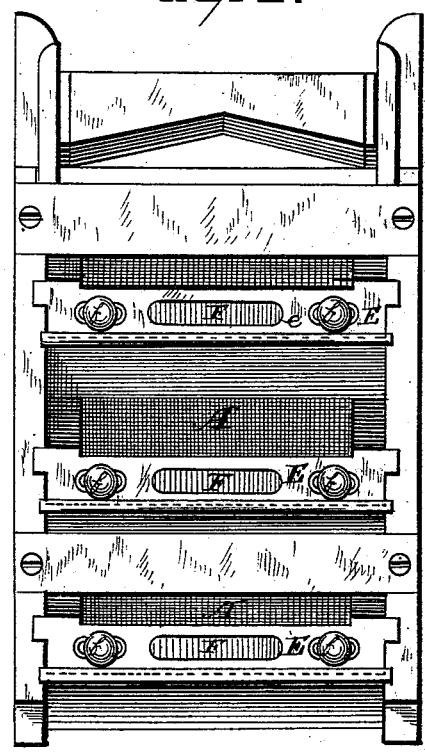

Referring to the drawings, Figure 1 is a view, in front perspective, of a machine embodying the invention. Fig. 2 is a view, in longitudinal central section, of same. Fig. 3 is a view, in cross-section, through line $x\,y$ of Fig. 2. Fig. 4 is a view, in elevation, of the interior end of the machine.

The several screens A are, respectively, provided with the cut-offs B, located beneath the same, and each supported upon screw-threaded shafts C, which engage therewith and have opposite end bearings in suitable frame-work of the machine. The forward extremities, $c$, of said shafts project outwardly from the front end of the vibrating frame of the machine, and are adapted to be operated at such point of position. These cut-offs may be of any suitable material or form, and are each adapted to empty into independent discharges D, whereby the several grades of the middlings or other matter may be collected distinctively, the same as they were separated.

The end inclosures, E, which are between the rear extremities of each pair of screens and returning-boards, are respectively provided with openings *e* and valve-bars F, the latter being connected with screw-threaded shafts *f* projecting from out the rear end of the vibrating frame of the machine. By means of having an opening (one or more) made in each of said inclosures, which are, respectively, between each screen and its corresponding returning-board, an air-draft passage is obtained, which permits the floss and light material to be drawn from out the machine at each of these several points, and thereby permits the separation of the middlings or other matter to be carried on without any mixing of the same with said impurities after the latter have been once removed therefrom. The valves cause these air-openings to be adjusted in size, and thus permit of any desired regulation of said draft. The movement of the valve-bars on the actuating-shafts causes them to be adjusted in parallel line with the respective end inclosures, and thus the draft is even or equalized at all points.

An advantage of this valve consists in the fact that the current of air cannot rush in straight line through the valve-opening, which would result in carrying out much good material. On the contrary, my valve causes the air to pass either over the upper edge or under the lower edge thereof, and nothing but light material can pass out through the valve-opening thus formed.

The operation of the machine causes the middlings or other matter to be purified to fall through the several screens, and, as the same is subjected to the respective currents of air which pass between each screen and its corresponding cut-off, that portion which is cleansed drops into the cut-offs and is duly discharged. The impurities and objectionable material from which the purified matter is separated pass out at the rear end of the machine, while the matter which drops from the screens upon the returning-boards next below passes to the head of the respective screens beneath the same, and the former operation is repeated.

The drawings, together with the above description, are intended simply to illustrate one form or manner of accomplishing the purpose of the main principles of my invention. The various parts not included within the latter—such as the form of the screens, hopper, suction-fan, vibrating frame, and other unessential elements—may be of any desired character, and the forms herein are given only as illustrations of an operative machine.

As regards the particular mechanism preferably employed by me, as shown and described herein, in carrying out my invention, I desire to be understood as in nowise restricting myself thereto. Many changes and modifications may be substituted for the particular forms represented. Thus, among other modifications, the cut-offs may be made so as to be more readily connected and disconnected with the machine, thus permitting their easy removal, as desired. Their adjusting mechanism may also be varied, and, if desired, two or more of the several cut-offs may have a common instead of independent discharges. The valves and valve-openings may be two or more for each of said inclosures respectively formed between the screens and their corresponding returning-boards, instead of having a single valve or single opening. The adjusting mechanism of said valves, as well as the form of the latter may also be varied.

Having fully described my invention, what I claim as new, and desire to secure by Letters Patent, is—

1. In a grain-purifier, a gang of screens and returning-boards, arranged alternately, in combination with a series of adjustable cut-offs located, respectively, between each screen and its returning-board, the same being adapted, as described, to separate that portion of the grain which passes through the forward or forward and central body, respectively, of each screen, and directly discharge it, while the remaining portion of the grain passes onto the next succeeding screen, there to be subjected to a repetition of said separating process, substantially as set forth.

2. In a grain-purifier, a gang of screens and returning-boards, arranged alternately one above the other, in combination with a series of adjustable cut-offs, located between each screen and its returning-board, and separate discharge-spouts for each of the said cut-offs, the same being adapted, as described, to separate and independently discharge from the machine that portion of the grain which falls through the forward or forward and central body, respectively, of the several screens, substantially as set forth.

3. In a gang-screen purifying-machine, the combination, with a series of cut-offs located, respectively, between the several screens and their returning-boards, said cut-offs being provided with discharges, of rear-end inclosures provided with valve-openings, valves, and mechanism for securing the latter at any desired adjustment, the cut-offs being adapted to separate that portion of the grain which falls through the forward or forward and central portion, respectively, of the several screens, and the valves to subject said grain to an adjustable current of air during its passage from the screens, whereby the said separation may be regulated as desired, substantially as set forth.

4. The combination, with a screen, a returning-board, and a cut-off located between the forward or central portions of the two, of a rear-end inclosure adapted to provide an air-draft passage intermediate between the rear portions of said screen and returning-board, substantially as described.

5. The combination, with a screen, a returning-board, and a rear-end inclosure adapted to provide an air-draft passage between the two, of a valve-bar and screw-threaded shafts adapted to adjust the latter in line with said inclosure, substantially as described.

6. In a gang-screen purifying-machine, the combination, with a series of cut-offs located, respectively, between each screen and its returning-board, of screw-threaded shafts, upon which said cut-offs are supported, and which longitudinally adjust the same in any desired position, substantially as set forth.

7. In a gang-screen purifying-machine, the combination, with a series of cut-offs located, respectively, between each screen and its returning-board, and having depending lugs formed on their under sides, of screw-threaded shafts, which engage with holes made in said lugs, and thereby adjust the cut-offs, while at the same time they support the latter in raised position from the returning-boards, substantially as set forth.

8. In a gang-screen purifying-machine, the combination, with a series of adjustable cut-offs located, respectively, between each screen and its returning-board, of independent spouts connecting with said cut-offs, which latter are formed as plates having vertical flanges or guards on all sides, and provided with discharge-openings, substantially as set forth.

In testimony that I claim the foregoing I have hereunto set my hand this 27th day of August, 1878.

WILLIAM HAWKINS RHODES.

Witnesses:
HIRAM BRIGHT,
F. E. FOSEL.